(12) United States Patent　(10) Patent No.: US 7,346,439 B2
Bodin　(45) Date of Patent: Mar. 18, 2008

(54) LOCATION-BASED INTELLIGENT REMOTE VEHICLE FUNCTION CONTROL

(75) Inventor: William Kress Bodin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1193 days.

(21) Appl. No.: 10/290,223

(22) Filed: Nov. 7, 2002

(65) Prior Publication Data

US 2004/0093291 A1　May 13, 2004

(51) Int. Cl.
G06F 19/00　(2006.01)
G01C 21/00　(2006.01)

(52) U.S. Cl. .............................. 701/36; 701/2; 701/49; 340/425.5; 307/10.3

(58) Field of Classification Search .................. 701/36, 701/2, 29, 33, 35, 1, 49, 213; 340/439, 425.5; 307/10.3, 10.5; 455/456.1, 456.2, 414.1, 455/419
See application file for complete search history.

(56) References Cited

U.S. PATENT DOCUMENTS

| | | | |
|---|---|---|---|
| 5,442,553 A | 8/1995 | Parrillo | 455/420 |
| 5,619,412 A * | 4/1997 | Hapka | 701/36 |
| 5,815,071 A | 9/1998 | Doyle | 340/439 |
| 5,922,037 A | 7/1999 | Potts | 701/29 |
| 6,094,609 A | 7/2000 | Arjomand | 701/29 |
| 6,285,931 B1 | 9/2001 | Hattori et al. | 701/29 |
| 6,292,724 B1 * | 9/2001 | Apsell et al. | 701/29 |
| 6,339,736 B1 | 1/2002 | Moskowitz et al. | 701/29 |
| 6,370,454 B1 | 4/2002 | Moore | 701/29 |
| 6,717,527 B2 * | 4/2004 | Simon | 340/825.36 |
| 6,718,235 B1 * | 4/2004 | Borugian | 701/1 |
| 6,748,322 B1 * | 6/2004 | Fernandez | 701/213 |
| 2001/0037168 A1 | 11/2001 | Hozuka et al. | 701/29 |
| 2002/0045976 A1 | 4/2002 | Kodama et al. | 701/29 |
| 2003/0163249 A1 * | 8/2003 | Kapolka et al. | 701/123 |

OTHER PUBLICATIONS

"Information Everywhere: New Opportunities for Pervasive Technology", IBM Corp., Mar. 2000, 8 pages.

* cited by examiner

Primary Examiner—Tan Q. Nguyen
(74) Attorney, Agent, or Firm—Robert H. Frantz; Mark S. Walker (57) ABSTRACT

An in-vehicle monitor detects the occurrence of a meta-event related to the operation of a vehicle, such as the vehicle's operation over a maximum allowable speed, operation in a prohibited geographic area, operation during a specific time frame, or combinations thereof. The monitor signals a server via a wireless data link, and the server determines an appropriate deferred action to be taken by an in-vehicle controller, such as disabling the engine, limiting vehicle speed, and locking vehicle doors, upon occurrence of a second meta-event including conditions such as time delays, vehicle speed and direction, and vehicle location. The system can thereby allow orderly and safe control of vehicle functions for purposes such as terminating a pursuit, enforcing legal sentences and operator restrictions, and controlling fleet vehicle operations.

18 Claims, 4 Drawing Sheets

LOCATION-BASED INTELLIGENT REMOTE VEHICLE FUNCTION CONTROL

CROSS-REFERENCE TO RELATED APPLICATIONS (CLAIMING BENEFIT UNDER 35 U.S.C. 120)

This patent application is related to U.S. patent application Ser. No. 10/232,246, filed on Aug. 29, 2002, by William Kress Bodin, et al., entitled "Anticipatory Mobile System Service Brokering and Resource Planning from Multiple Providers".

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Not applicable.

BACKGROUND OF THE INVENTION

1. Field of the Invention

This invention relates to the technologies of remote control of vehicle functions such as engine enabling and disabling, throttle and speed governors, and the like.

2. Background of the Invention

Vehicles of all types, be it trucks, boats, cars, or airplanes, are subject to theft, hijacking and flight from law enforcement. In fact, often times, vehicles which are being pursued by law enforcement are also stolen or hijacked. So, often, two of these conditions exist simultaneously.

Owners of fleets of vehicles such as rental car companies and over-the-road trucking companies often install special monitoring and communications systems which report each vehicle's location, and allow for remote disabling of the engine and locking or unlocking of the doors. Such commercial grade systems allow for tracking of the vehicle using on-board Global Positioning Systems ("GPS") and wireless communications such as two-way paging networks, cellular and Personal Communications Systems ("PCS") data links, and other wireless communications systems. Companies such as At Road Inc., eTracker Inc., and Racor Industries provide these systems to the commercial fleet operators at costs which are prohibitive for use in typical private vehicles, as the cost of the dedicated hardware mounted in the vehicle is too expensive for the only function they provide—tracking and monitoring.

LoJack Corporation provides a system which is more cost effective for private vehicle operators, with a nominal hardware initial cost followed by monthly service charges. LoJack, though, has not found widespread use and acceptance as even their cost structure is out of reach for many ordinary vehicle owners.

An additional problem with many of these types of systems is that their engine enablement/disablement capabilities are relatively unintelligent. For example, if a code is transmitted to a car to disable then engine, normally, the engine will not be disabled until the car is at rest. In some cases, the engine is not actually disabled while it is running, but rather is disabled from being restarted. These approaches are adopted to avoid "killing" a vehicle engine while it is moving, such as while it is pulling into traffic, which could pose a serious safety problem.

As such, many of these systems are of little assistance to law enforcement when pursuing a vehicle equipped with such a system as the engine disabling function would only take effect when, and if, the car is stopped.

Other technologies have been developed for attempting to disable vehicles in flight from law enforcement, include tire puncturing devices (e.g. "stop sticks") and engine stalling "guns" which produce an electromagnetic pulse ("EMP") capable of temporarily disrupting operation of the vehicle's control computer. Both systems, however, lack selectivity (e.g. the EMP can disable pursuing police vehicles and the stop sticks can damage police vehicle tires) and effectiveness, which leaves the pursuing law enforcement in a position of continuing the chase, thereby placing the general public and the agency personnel in danger.

Therefore, there is a need in the art for a new technology which provides highly selective control of vehicle functions, enables a continuum of vehicle function control and degradation under specific conditions, and is realizable in technology which will be justifiable in cost and function as an addition to ordinary vehicles.

BRIEF DESCRIPTION OF THE DRAWINGS

The following detailed description when taken in conjunction with the figures presented herein provide a complete disclosure of the invention.

SUMMARY OF THE INVENTION

Our new system cooperates with and integrates to In-Vehicle Information Systems ("IVIS") which are becoming common place in ordinary vehicles. Such IVIS are provided to allow the vehicle operator to take advantage of a number of location based services ("LBS"), such as booking hotels, securing vehicle repairs, etc., as well as general information access such as browsing the Internet, receiving electronic messages, etc. IVIS also interface to the vehicle's electronic control module ("ECM") in order to receive information regarding vehicle state, on-board sensors, diagnostic information, etc.

By cooperating with the IVIS and with network servers, our new system provides intelligent control of certain vehicle functions and software components remotely for recovery of stolen vehicles, safe termination of pursuits, etc. Disablement actions can be created included dependencies on vehicle parameters including speed, precise location, time, direction, etc., including scheduled or deferred actions. For example, upon receipt of a vehicle by a renter, the fleet control system can set a deferred engine disablement to take effect several hours after the reserved rental period, as well as set a conditional engine disablement if the vehicle travels out of an approved geographic area (e.g. more than 100 miles from the rental station). In another example, a law enforcement agency could set a deferred action to restrict vehicle speed to 25 MPH or less for 30 minutes (enough time to complete a pursuit) while the vehicle is on a freeway, and to 10 MPH while it is on an exit ramp, and disable the engine when the car leaves the freeway and drops below 5 MPH, in order to produce a transitional effect or gradual degradation to the vehicle's operation (and a safe conclusion to the pursuit). Other vehicle functions can also be controlled conditionally, such as setting an action to lock the vehicle doors when the vehicle slows below 5 MPH (or disable door unlocking) to prevent vehicle occupants from "bailing out" and fleeing on foot near the end of a pursuit.

By integrating the functions with system hardware which is provided on the vehicle for other purposes and uses (e.g. IVIS display, GPS, cellular phone, ECM), the present invention represents only a cost increase in terms of software functions and network-based services, thereby allowing it to enjoy wider deployment into ordinary vehicles as well as corporate and fleet vehicles.

DETAILED DESCRIPTION OF THE INVENTION

The present invention provides vehicle owners, fleet operators, and law enforcement agencies the ability to selectively and remotely control certain vehicle functions based upon the location of the vehicle, its speed and direction, and time. Implementation of control actions may be deferred or scheduled, and may be coupled with conditional requirements to allow for gradual and safe operation of the vehicle. Control actions may be specified via a Web-based interface (e.g. web site or web page), cellular interface (e.g. voice or text response unit), or a remote function configurator.

The invention allows provisionsing, activation and deactivation of software components and features via an IVIS. There are a number of useful scenarios and situations for the present invention, but for ease of understanding the invention, we will initially use a police chase for illustration. Car jackings are common within the proximity of airports where out-of-town tourists commonly rent cars. Our system is able to assimilate multiple variables including, but not limited to, location, speed, and surroundings, such that the invocation of a "deferred" or conditional action such as limiting the vehicle speed, operating door locks, or disabling the engine can take place in a safe and secure manner.

Figure 1:
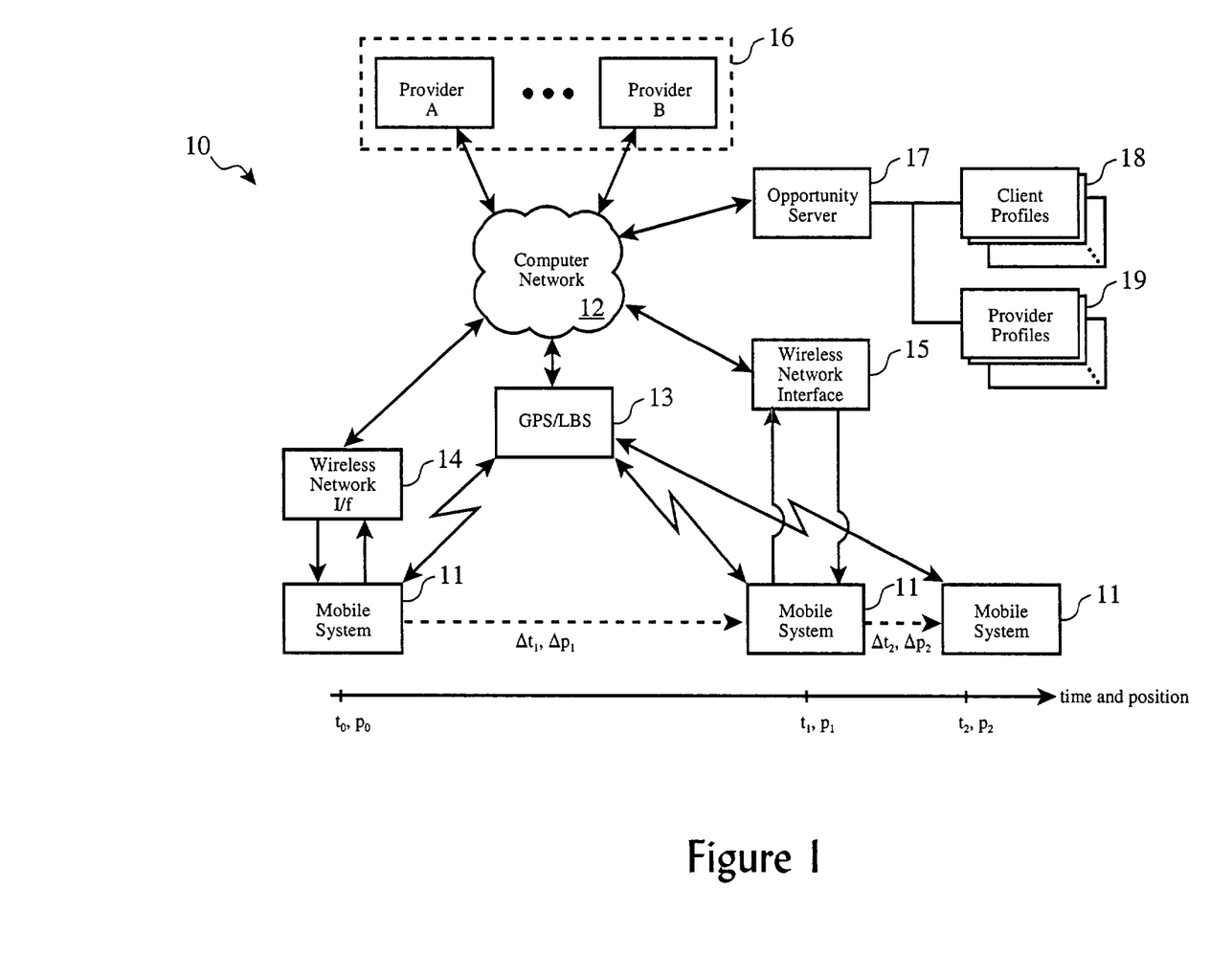
FIG. 1 shows the high level organization of the system according to the invention.

The invention integrates several well-known technologies via an application server and one or more computer networks, as shown in FIG. 1. The following technologies and terminologies are used within this disclosure.

Location Based Services ("LBS")—a set of services which are associated with and driven by the location of a device such as a wireless telephone, personal digital assistant, or other computer. LBS may use one of several available technologies to determine the geographic location of a device, including but not limited to GPS, the Federal Communication Commission's Enhanced 911 ("E911") or micro-networks such as open-standard BlueTooth.

Global Positioning System ("GPS")—any one of several available technologies for determining geographic position electronically, including most prevalently use of a network of satellites in geosynchronous orbit and a receiver to pinpoint the receiver's location. Older systems, such as LORAN and TRANSIT, may be used, as well. Regional positioning may be determined using signal triangulation or other methods commonly employed to determine in which cell in a cellular system a transceiver is located.

Computer network—most preferably the Internet, but also possibly local area networks ("LAN"), wireless area networks ("WAN"), private networks and intranets.

Wireless network—any suitable communications network for data transmission and reception including Personal Communications Systems ("PCS"), wireless LAN, light wave (e.g. infrared) networks, and radio-based data links, all of which may be of proprietary nature or may conform to one of many well-known wireless standards.

Mobile System—used generally to refer to any system which is able to diagnose its own faults and failures and which may be transported, and especially, but not limited to, the control and diagnostic computers for vehicles such as automotive Electronic Control Modules ("ECM"). A mobile system, however, does not have to be part of a vehicle, but may be vehicle-born, such as certain electronic systems carried in aircraft and ships which may need maintenance actions.

Mobile System Diagnostic System—any system used to diagnose a mobile system such as a vehicle or other system which can be transported. We will use terms conventional to the automotive industry for this disclosure to broadly encompass similar terms from other mobile systems industries such as aviation, rail and maritime shipping. For example, we will refer to records regarding detected failures and potentially diagnosed root causes as Diagnostic Trouble Codes ("DTC"), and the computer which performs the monitoring of sensors, recording of failures and conditions, and transmission of DTC records as an electronic control module ("ECM"). It will be evident to those skilled in the art that the invention is not related to an automotive implementation, and that the use of these terms from automotive parlance is for understandability and presentation of a preferred embodiment only.

Meta-event—a point in time where several conditions are met simultaneously, including but not limited to, expiration of a timer, reaching a time value, reaching a minimum or maximum speed, entering or leaving a geographic area, etc. Conditions of a meta-event may include static variables such as age or date of birth of vehicle operator, and legal status of operator or vehicle (e.g. detained, arrested, impounded, etc.).

Deferred Action—an action made by an IVIS or ECM which is delayed until a meta-event is encountered.

Turning now to FIG. 1, the general system organization (10) of the invention is shown. A mobile system, such as a car having an ECM and IVIS, initially is a location or position $p_0$ at an initial time $t_0$ when a pre-determined meta-event is detected within a monitored system. Using a GPS or LBS subsystem such as a GPS receiver, the initial position $p_0$ is recorded with the other meta-event detected conditions. For example, if a meta-event has been defined for a rental vehicle leaving the boundaries of a state within a given time frame (e.g. 48 hours from time of rental), the system monitors a timer/clock and the GPS position, and determines that the meta-event has occurred.

Other sensors and subsystems status may be monitored, as well, such as engine status, door open sensors, anti-lock brake state, fuel level, etc., which may be set as conditions of meta-events for triggering invocation of deferred actions. Diagnostic trouble codes ("DTC"), such as the International Standards Organization's Controller-Area Network ("CAN") or Society of Automotive Engineers' J1850 format codes, may also be evaluated as conditions of meta-events.

These various status and codes are then transmitted to an opportunity server (17), first via a wireless network, and secondly by a computer network (12). According to one possible embodiment, the wireless network interface is an IBM eNetworks Wireless Switch coupled with convention wireless data communications facilities such as a Personal Communications System ("PCS") transceiver. Other wireless network solutions, such as Motorola's Ricochet network, may be employed as well. The computer network is preferably the well-known Internet, but may be a proprietary or private network (e.g. LAN, WAN, etc.).

In the disclosure of the related patent application, the opportunity server received these codes and arranged for services and products needed by the vehicle or its operator. In the present invention, however, the opportunity server may implement tracking functions and/or remote vehicle control functions for organizations such as fleet operators or law enforcement agencies, as will be described in more detail in the following paragraphs.

A set of user profiles, which includes user preferences as well as user characteristics (e.g. age, legal limitations, etc.) (19) for the vehicle operator, which are accessible by the functions of the server for decision making.

In the present invention, as well, the provider servers (16) may represent other organizations servers who are providing service or monitoring of the vehicle, such as private security firms, other law enforcement agencies servers, fleet asset management systems, etc.

The provider servers may then, in response to the codes and meta-events received from the vehicle, respond with deferred actions to the opportunity server (15) for downloading to the vehicle IVIS and/or ECM. These deferred actions typically define additional meta-events upon the occurrence of which trigger certain actions.

For example, assuming a set of codes and meta-events received from the vehicle indicate that it is traveling over the known speed limit. A rental car server (e.g. a provider server operated by the rental car company) processes this meta-event. The logical process of the rental car server determines that it is occasionally legal and proper to exceed the speed limit but only temporarily, such as the period of time it takes to accelerate and overtake a vehicle while passing. But, to avoid damage to the vehicle, excessive wear, and potential damage due to reckless driving, the rental car server may transmit a deferred action such as shown in Table 1.

TABLE 1

Example Deferred Action

```
startAction
    When (time => time_now+15 AND speed => 75) then
        (speed_governor_state = ON)
        (speed_governor_rate = 55)
    endWhen;
endAction
```

An deferred action such as this would cause the speed governor to be activated to limit the vehicle's speed to 55 MHP after 15 minutes from receipt of the deferred action, if the speed remains at 75 MHP or higher during that period. Other variables, such as GPS location, direction, door open status, etc., can be used to create a wide variety of useful deferred actions and controls in a similar manner.

In another example, a law enforcement server could send a deferred action to slowly decrease the maximum speed of the vehicle, such as shown in Table 2.

TABLE 2

Example Deferred Action with Sequential Effects

```
startAction
    When (time => time_now+2) then
        (speed_governor_state = ON)
        (speed_governor_rate = 65)
    endWhen;
    When (time => time_now+3) then (speed_governor_rate = 50);
    When (time => time_now+4) then (speed_governor_rate = 40);
    When (time => time_now+5) then (speed_governor_rate = 25);
    When (time => time_now+6) then (speed_governor_rate = 10);
    When (time => time_now+7) then
        (speed_governor_rate = 5)
        (door_locks = locked)
        (door_lock_control = disabled)
    endWhen;
    When (time => time_now+8) then (engine = disable);
endAction
```

This deferred action sets a series of speed governor limits slowly and safely decreasing the speed of the vehicle, and eventually killing the engine, locking the doors, and disabling the occupants' door lock controls. Later, when an appropriate law enforcement presence has been attained, another deferred action such as shown in Table 3.

TABLE 3

Example Deferred Action with Immediate Effects

```
startAction
    (door_locks = unlocked)
endAction
```

This deferred action could be transmitted to the vehicle to immediately unlock the doors and allow the occupants to be removed for arrest, and the car to be searched.

Location of the vehicle can be included in the conditional evaluation of the action, such as shown in Table 4.

TABLE 4

Example Deferred Action with Position Condition

```
startAction
    If (position = p₁ AND time => t₁) then (engine = disabled)
endAction
```

Figure 2:
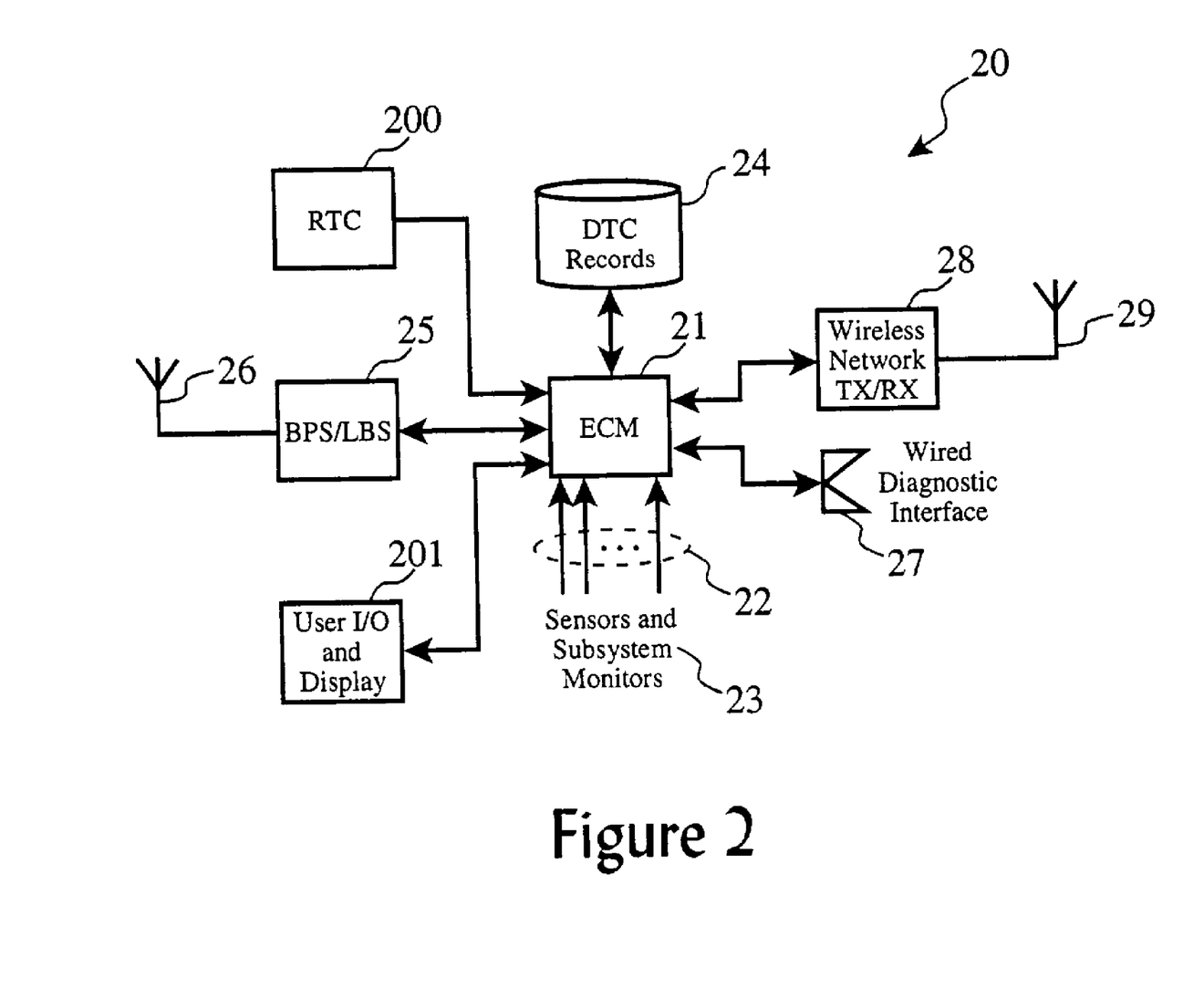
FIG. 2 provides details of an enhanced electronic control module.

Turning to FIG. 2, more details of the enhanced ECM (20) of the mobile system according to one available embodiment are shown. The ECM (21), which includes a microprocessor or microcontroller, is interfaced (22) to a plurality of sensors and other subsystem monitors (e.g. controllers in a transmission, fuel injectors, etc.) via a bus such as the aforementioned J1850 or CAN bus, or appropriate proprietary or standard bus according to an alternate embodiment and vehicle application. Through this interface (22), the ECM receives information regarding detected failures, faults and out-of-range conditions, which are recorded in DTCs in the ECM memory (24).

The enhanced ECM (20) is also provided with location means, such as a GPS receiver or LBS-enabled wireless interface (25, 26), as well as a real-time clock (200). The location of the vehicle at the time of the detected event is recorded either with each DTC and/or meta-event, or in a separate DTC or meta-event associated with the first DTC or meta-event (e.g. record pairs).

Contact with the opportunity server is possible through a wireless network interface (28, 29), such as a PCS interface, to the remote opportunity server, and the DTC's are transmitted or uploaded to the server.

Using the wireless network interface (28, 29), the enhanced ECM (20) may receive the deferred actions from the opportunity server. User (operator) prompts and notices may be through a visual display, such as using an LCD or TFT display, or audibly using text-to-speech or telephone audio channels. For example, a deferred action may include a controls such as shown in Table 5.

TABLE 5

Example Deferred Action with User Interface Effects

```
startAction
    When (time = time_now+2) then
        (display_text = "WARNING: Vehicle Shutdown in 1 Minute)
        (audible_alert = ON)
    endWhen;
    When (time = time_now + 1) then (engine = disabled);
endAction
```

Some system functions may be provided in combination with each other. For example, GPS operates on transmission of time-based signals from satellites to the GPS receivers, and as such, a GPS receiver includes a real-time clock. Also, a PCS phone which is LBS-enabled can also be employed as the wireless network interface.

Figure 3:
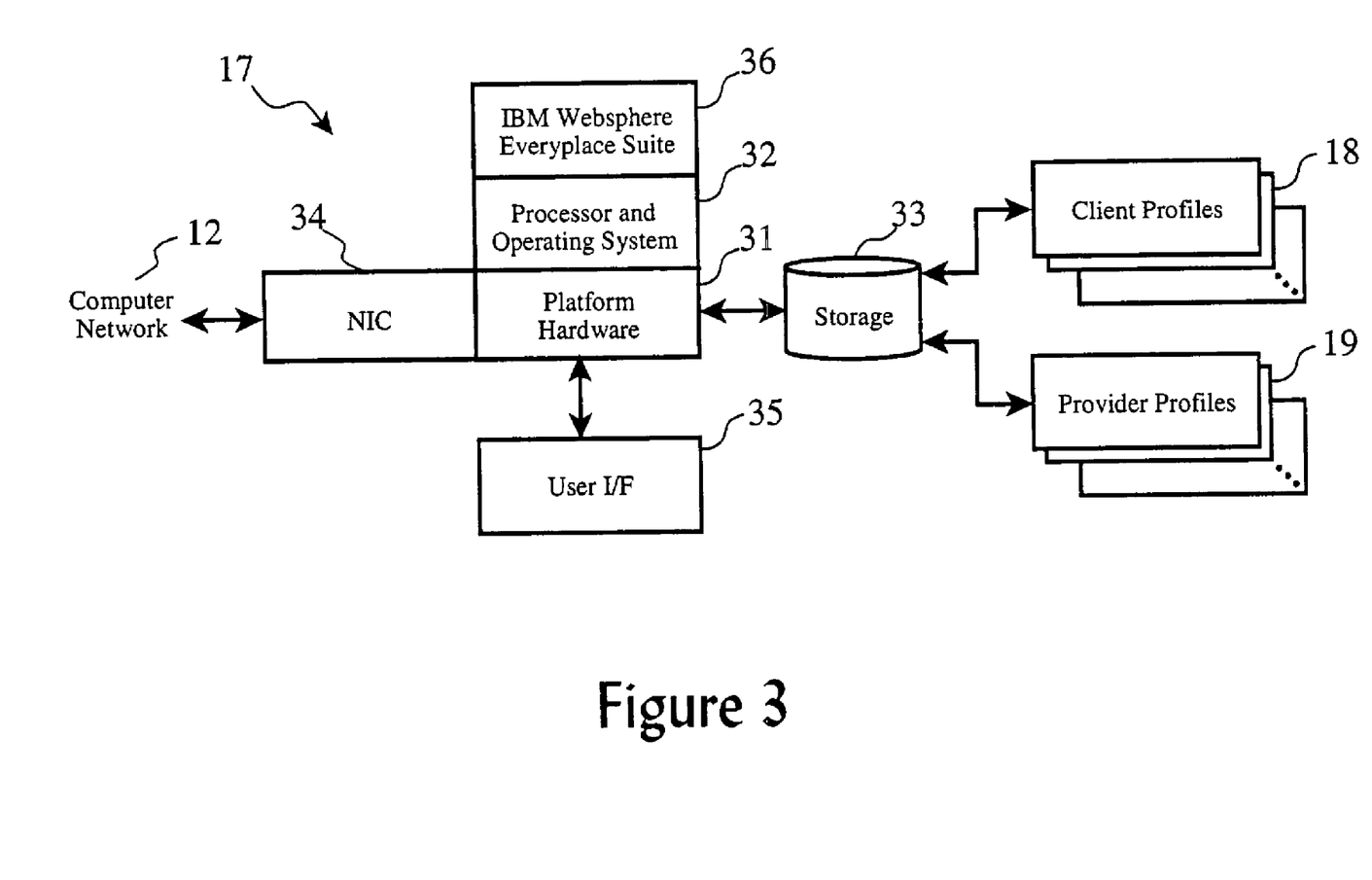
FIG. 3 provides details of the opportunity server.

FIG. 3 provides more details of the opportunity server (17), which includes a common web server computing hardware platform (31) and operating system (32). The computing platform is preferrably an IBM eServer such as the IBM i-Series, or any other suitable computer platform such as an IBM-compatible personal computer, Sun Microsystem's server, or other capable computer. The hardware platform is also preferrably equipped with a network interface ("NIC") (34) for communication with the computer network (12) such as the Internet. The NIC (34) may be as simple as a modem, or as sophisticated as a high bandwidth digital subscriber loop ("DSL") or T-1 interface (or better). The hardware platform is also preferrably provided with a set of user interface devices (35) such as a display, keyboard and mouse, for administration and configuration activities.

The operating system is preferrably IBM's AIX operating system, which is well adapted to web server applications, but may also be any other suitable operating system including but not limited to IBM's OS/2, Sun Microsystem's Solaris, Unix, Linux, or Microsoft's Windows. The opportunity server is also preferably provided with one or more persistent storage devices (33) such as a disk array.

To realize the invention in the opportunity server, a web server suite, preferably IBM's WebSphere Everyplace Suite, is provided with a number of application programs or scripts to implement the logical processes of the invention, as described in the preceding paragraphs and in more detail in the following paragraphs. The WebSphere product is well known in the industry, and methods and tools for implementing custom logical processes for networked business solutions are commonplace as the WebSphere product is widely in use by businesses, financial institutions, and government agencies around the world. Other suitable a capable software programs and/or suites may be utilized in place of the WebSphere product without departing from the spirit and scope of the present invention.

The logical processes are preferably implemented in part in the mobile system's enhanced ECM (e.g. firmware or software), in part in the customizable logical processes (e.g. Java, scripts, etc.) on the opportunity server, and in part by the provider's servers, as described in the following paragraphs.

Figure 4:
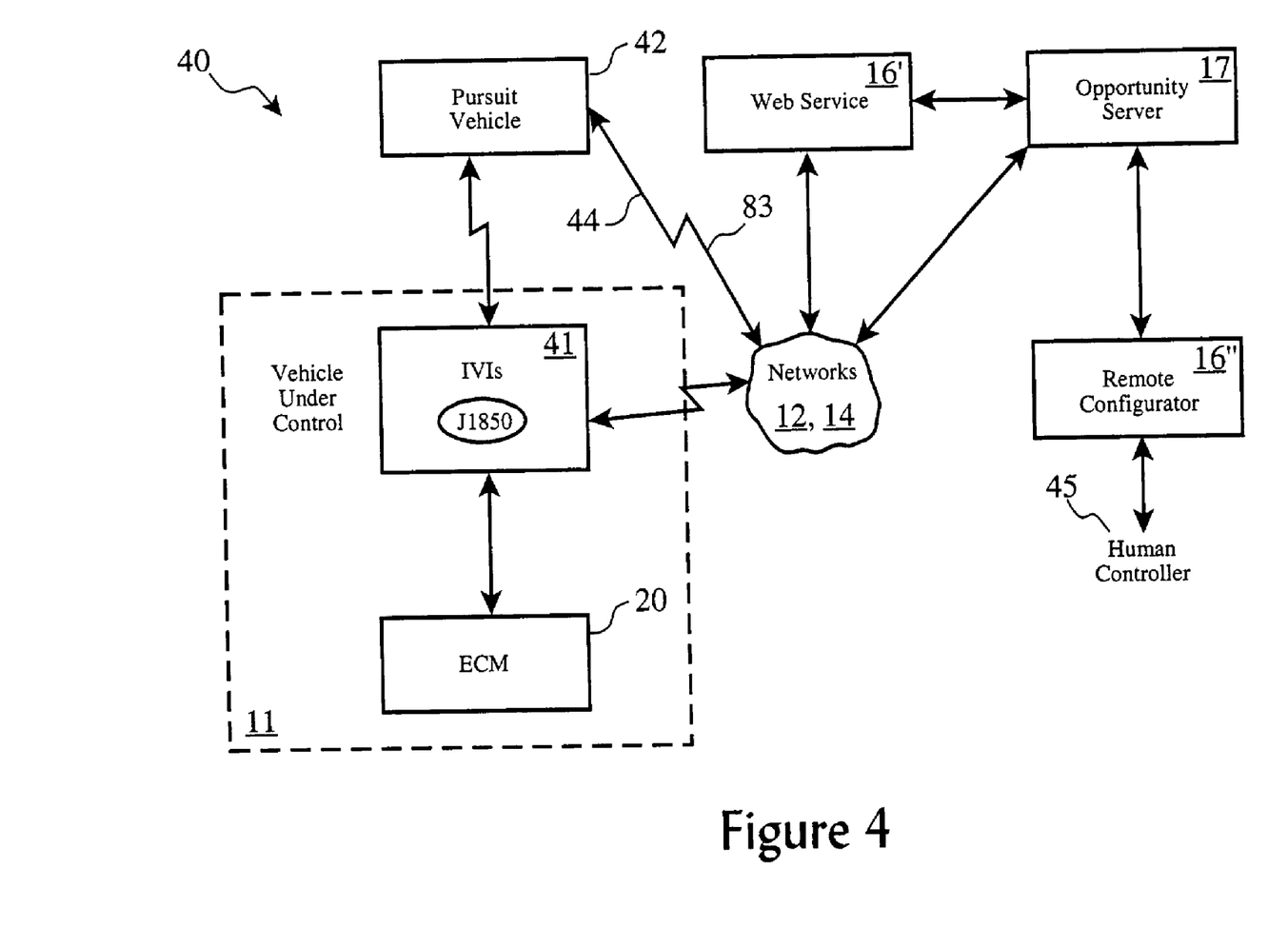
FIG. 4 sets forth a depiction of one example use and embodiment of the invention from a particular perspective of controlling a vehicle in pursuit.

FIG. 4 shows another perspective (40) of the system including the present invention of the previously discussed pursuit control functions. In this depiction, the pursued vehicle (11) is in communications via the wireless and wired networks (12, 14) with the opportunity server (17). Likewise, the pursuit vehicle (42) such as a police cruiser may communicate with the provider servers (16', 16") via a well-known wireless network (44) such as those previously discussed for use with the vehicle under control (11). For example, the pursuing police officer could use a in-vehicle data terminal or cell phone to access the application program of the web service to cause the desired deferred action to be created and downloaded to the vehicle (11). Or, the officer could communicated by radio or phone to a human controller (45) what is needed, and the human controller could communicate with a provider server (16") (e.g. web page) to create the deferred action.

In another embodiment of the invention, a wireless communication scheme between the pursuit vehicle and the vehicle under control (11) can be employed to cause final triggering of the deferred action. A short range wireless means such as an InfraRed Data Arrangement ("IrDA") or Blue Tooth could communicate a final code to the IVIS for meeting a final condition of a meta-event. For example, the sequence previosly described in which a vehicle's speed was sequentially decreased, doors were locked and the engine was disabled, followed by another deferred action of unlocking the doors when the police were read to affect the arrest, the final unlocking could alternately be controlled as shown in Table 6.

TABLE 6

Example Deferred Action with Code as a Condition

```
startAction
    When (IRDA = 1234) then (door_locks = unlocked);
endAction
        - or -
startAction
    When (BlueTooth = 1234) then (door_locks = unlocked);
endAction
```

The officer would be provided the code "1234" (or would request a code of his or her choice), and would enter this code into his or her BlueTooth transmitter or IrDA transmitter when ready to remotely unlock the vehicle doors.

Having described the invention and one application of the new system and method, it will be appreciated by those skilled in the art that many other uses, applications and configurations of the invention are possible, including but not limited to those described in the following paragraphs.

New Vehicle Break-in and Warranty Validation. By monitoring the speed of a new vehicle which is required to be kept under a given maximum speed during a break-in period, a meta-event can be defined and triggered when the vehicle is operated in a manner inconsistent with maintaining a valid warranty. In a first downloaded deferred action, a server for the vehicle's manufacturer could provide an audible or visible warning and notice to the operator. The deferred action can also be defined to limit the operation of the vehicle to comply with the warranty, such as may be desired by the owner of a leased vehicle.

Special vehicle limitations based on operator characteristics. Certain characteristics of the operator, such as age or legal status, can be included in meta-event conditions and deferred actions. For example, the speed driven by a teenager could be monitored and controlled such that only momentary speeds over a nominal maximum are allowed, and otherwise, the speed is governed to the nominal maximum. An elderly person with vision problems in low light could be allowed to drive only under daylight conditions, in another example.

The legal status of the operator can also be usefully employed to monitor and control a vehicle. In one example, a person serving a deferred sentence for driving under the influence of alcohol could be restricted from stopping or parking his or her vehicle in the vicinity of a bar. In another example, a person under house arrest or with a partially suspended license (e.g. allowed to use for work commuting only) could be allowed only to use the car during certain hours and only along certain paths (e.g. path from home to work, home to grocery store, etc.), otherwise the vehicle could be disabled. In yet further examples, registered sex offenders could be prevented from driving their vehicles in certain areas (e.g. near schools, parks, etc.) at certain times, and persons subject to victims protective order restrictions could be prevented from driving their vehicles in certain areas (e.g. near their estranged spouse's home and workplace).

For these uses, a predetermined route of GPS way points could be defined in a meta-event, possibly including time ranges during which the vehicle may be near each way point, to establish an "approved" or allowable route for the vehicle to be operated. If the vehicle is operated off of the predetermined path, it could be disabled.

Rental car monitoring and control. Rental cars can be disabled automatically after the rental period with a grace period has expired, or if the vehicle is operated in a manner outside the rental agreement conditions (e.g. outside a geographic area, over the speed limit, etc.)

Roadside stop control of vehicles. Vehicles which have been "pulled over" for routine traffic violations (e.g. not subject to pursuit) could be disabled from shifting from park or neutral into a forward or reverse gear until an officer has authorized return to normal operation. This would allow the car to continue running so as to allow air conditioning in the vehicle to continue (e.g. to protect an infant occupant), but would prevent sudden flight from the road stop or attempt to run over the officer.

"Soft" Impound of Vehicles. Many traffic control agencies physically two illegally parked vehicles, which incurs towing cost, possibility of damage to the vehicle, and causes extreme inconvenience to the car owner. Some agencies use "wheel boots" which lock around a vehicle's tire to immobilize it, thereby impounding it in place until a fee or fine is placed, and avoiding need to physically tow or retrieve the vehicle. Our new system and method could be used to impound a vehicle in place without the use of a wheel boot by simply downloading a deferred action disabling the engine and locking the transmission in park, the latter effect preventing the owner from having his or her car towed away of his own volition.

While certain details of various embodiments, applications and uses of the present invention have been disclosed to illustrate the invention, it will be recognized by those skilled in the art that variations, substitutions, and alternate uses of the invention may be made without departing from the scope of the invention. Therefore, the scope of the present invention should be determined by the following claims.

What is claimed is:

1. A method comprising the steps of:
    establishing a first meta-event related to the operation of a vehicle;
    responsive to occurrence of said first meta-event, to receive from a law enforcement authority authorization to command a deferred door locking action for a control system of said vehicle;
    providing said deferred door locking action command to said vehicle control system;
    responsive to occurrence of a second meta-event, implementing said door locking action by said vehicle control system;
    maintaining said door locking action while blocking unlocking operations by occupants of a vehicle until receipt of an unlock command transmitted from a law enforcement authority via a short-range wireless device; and
    responsive to receipt of said unlock command, discontinuing said door locking action.

2. The method as set forth in claim 1 wherein said step of establishing a first meta-event comprises defining a meta-event including at least one condition selected from the group of time, vehicle speed, vehicle position, vehicle direction of travel, and operator characteristic.

3. The method as set forth in claim 1 wherein said step of discontinuing said door locking action is performed responsive to a receipt of an unlock command via a BlueTooth interface.

4. The method as set forth in claim 1 wherein said step of determining a deferred action comprises defining at least one vehicle control action to be taken selected from the group of establishing a third meta-event for monitoring vehicle operation, limiting vehicle speed, limiting vehicle direction, disabling vehicle engine, locking vehicle doors, unlocking vehicle doors, displaying an operator message, playing an operator message, disabling operator door lock controls, and disabling vehicle shifting from a stationary state to a moving state.

5. The method as set forth in claim 1 wherein said step of discontinuing said door locking action is performed responsive to a receipt of an unlock command via an Infrared Data Arrangement interface.

6. The method as set forth in claim 1 wherein said step of determining a deferred action to be implemented by a control system for said vehicle upon occurrence of a second meta-event comprises establishing a condition of said second meta-event including receipt of a code via a wireless communications network.

7. A computer readable medium encoded with software for performing the steps of:
    establishing a first meta-event related to the operation of a vehicle;
    responsive to occurrence of said first meta-event, to receive from a law enforcement authority authorization to command a deferred door locking action for a control system of said vehicle;
    providing said deferred door locking action command to said vehicle control system;
    responsive to occurrence of a second meta-event, implementing said door locking action by said vehicle control system;
    maintaining said door locking action while blocking unlocking operations by occupants of a vehicle until receipt of an unlock command transmitted from a law enforcement authority via a short-range wireless device; and responsive to receipt of said unlock command, discontinuing said door locking action.

8. The computer readable medium as set forth in claim 7 wherein said software for defining a first meta-event comprises software for establishing a meta-event including at least one condition selected from the group of time, vehicle speed, vehicle position, vehicle direction of travel, and operator characteristic.

9. The computer readable medium as set forth in claim 7 wherein said software for determining a deferred action comprises software for providing a evaluation service of said first meta-event over a computer network by a provider server.

10. The computer readable medium as set forth in claim 7 wherein said software for determining a deferred action comprises software for defining at least one vehicle control action to be taken selected from the group of establishing a third meta-event for monitoring vehicle operation, limiting vehicle speed, limiting vehicle direction, disabling vehicle engine, locking vehicle doors, unlocking vehicle doors, displaying an operator message, playing an operator message, disabling operator door lock controls, and disabling vehicle shifting from a stationary state to a moving state.

11. The computer readable medium as set forth in claim 7 wherein said software for discontinuing said door locking action is performed responsive to a receipt of an unlock command via a BlueTooth interface.

12. The computer readable medium as set forth in claim 7 wherein said software for discontinuing said door locking action is performed responsive to a receipt of an unlock command via a BlueTooth interface.

13. A vehicle remote control system comprising:

an in-vehicle monitor configured to detect a first meta-event related to operation of a vehicle and to signal a control server upon detection of said first meta-event;

a control server configured to receive said first meta-event signal, to receive authorization from a law enforcement authority to command a deferred door locking action to be implemented by an in-vehicle controller upon meeting occurrence of a second meta-event, and to transmit said deferred door locking action command to said in-vehicle controller; and an in-vehicle controller configured to receive from said control server said deferred door locking action command, to detect occurrence of said second meta-event, to implement said door locking action upon occurrence of said meta-event, to maintain said door locking action while blocking unlocking operations by occupants of a vehicle until receipt of an unlock command transmitted from a law enforcement authority via a short-range wireless device, and to discontinue said door locking action upon receipt of said unlock command.

14. The system as set forth in claim 13 wherein said in-vehicle monitor is further configured to detect occurrence of a meta-event including a condition selected from the group of time, vehicle speed, vehicle position, vehicle direction of travel, and operator characteristic.

15. The system as set forth in claim 13 wherein said unlock command is received over a BlueTooth interface.

16. The system as set forth in claim 13 wherein said control server is further configured to determine a deferred action including at least one vehicle control action selected from the group of monitoring for occurrence of a third meta-event, limiting vehicle speed, limiting vehicle direction, disabling vehicle engine, locking vehicle doors, unlocking vehicle doors, displaying an operator message, playing an operator message, disabling operator door lock controls, and disabling vehicle shifting from a stationary state to a moving state.

17. The system as set forth in claim 13 wherein said control server is further adapted to transmit said deferred action to said in-vehicle controller via a communications network including at least one network selected from the group of a computer network, a radio link, a light wave link, a telephone network, and a wireless data network.

18. The system as set forth in claim 13 wherein said unlock command is received over an Infrared Data Arrangement interface.

* * * * *